US011249354B2

United States Patent
Osawa et al.

(10) Patent No.: US 11,249,354 B2
(45) Date of Patent: Feb. 15, 2022

(54) DISPLAY DEVICE AND INTER-SUBSTRATE CONDUCTING STRUCTURE

(71) Applicant: Japan Display Inc., Tokyo (JP)

(72) Inventors: Shuichi Osawa, Tokyo (JP);
Yoshikatsu Imazeki, Tokyo (JP);
Yoichi Kamijo, Tokyo (JP); Yoshihiro Watanabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 309 days.

(21) Appl. No.: 16/205,533

(22) Filed: Nov. 30, 2018

(65) Prior Publication Data

US 2019/0171056 A1    Jun. 6, 2019

(30) Foreign Application Priority Data

Dec. 1, 2017 (JP) .............................. JP2017-231936

(51) Int. Cl.
| | | |
|---|---|---|
| *G02F 1/1345* | (2006.01) | |
| *G02F 1/1333* | (2006.01) | |
| *G02F 1/1335* | (2006.01) | |
| *G02F 1/1343* | (2006.01) | |
| *G06F 3/044* | (2006.01) | |
| *G06F 3/041* | (2006.01) | |
| *G02F 1/1339* | (2006.01) | |

(52) U.S. Cl.
CPC ...... *G02F 1/13452* (2013.01); *G02F 1/13338* (2013.01); *G02F 1/13458* (2013.01); *G02F 1/133512* (2013.01); *G02F 1/134309* (2013.01); *G06F 3/044* (2013.01); *G06F 3/0445* (2019.05); *G06F 3/0446* (2019.05); *G06F 3/04164* (2019.05); *G02F 1/1339* (2013.01); *G02F 1/134318* (2021.01); *G02F 1/134363* (2013.01); *G06F 3/0412* (2013.01)

(58) Field of Classification Search
None
See application file for complete search history.

(56) References Cited

U.S. PATENT DOCUMENTS

2013/0328051 A1* 12/2013 Franklin ................ H05K 1/028
257/59
2016/0093596 A1* 3/2016 Hong ................ G02F 1/133308
257/72
2017/0160574 A1* 6/2017 Yamaguchi ......... G02F 1/13306
(Continued)

FOREIGN PATENT DOCUMENTS

| JP | 2002-040465 A | 6/2002 | |
|---|---|---|---|
| JP | 2007235165 A * | 9/2007 | ............... H05K 1/11 |
| JP | 2010232249 A * | 10/2010 | ............... H05K 3/00 |

*Primary Examiner* — Edward J Glick
*Assistant Examiner* — Anthony G Quash
(74) *Attorney, Agent, or Firm* — K&L Gates LLP

(57) ABSTRACT

According to one embodiment, a display device includes a first substrate including a first basement and a first conductive layer, a second substrate including a second basement and a second conductive layer, and a display function layer. A second end surface of the second basement includes a flat portion located in a same plane as a first end surface of the first basement, and a first concave portion formed toward an inside of the second basement with respect to the flat portion. A connecting material which electrically connects the first conductive layer and the second conductive layer is provided in the first concave portion.

13 Claims, 10 Drawing Sheets

(56) References Cited

U.S. PATENT DOCUMENTS

| | | | | |
|---|---|---|---|---|
| 2017/0357121 A1* | 12/2017 | Cho | ...................... | G02F 1/1368 |
| 2018/0033800 A1* | 2/2018 | Koide | ................... | G06F 3/0445 |
| 2019/0148668 A1* | 5/2019 | Kamijo | ............... | H01L 27/3276 |
| | | | | 361/679.02 |

* cited by examiner

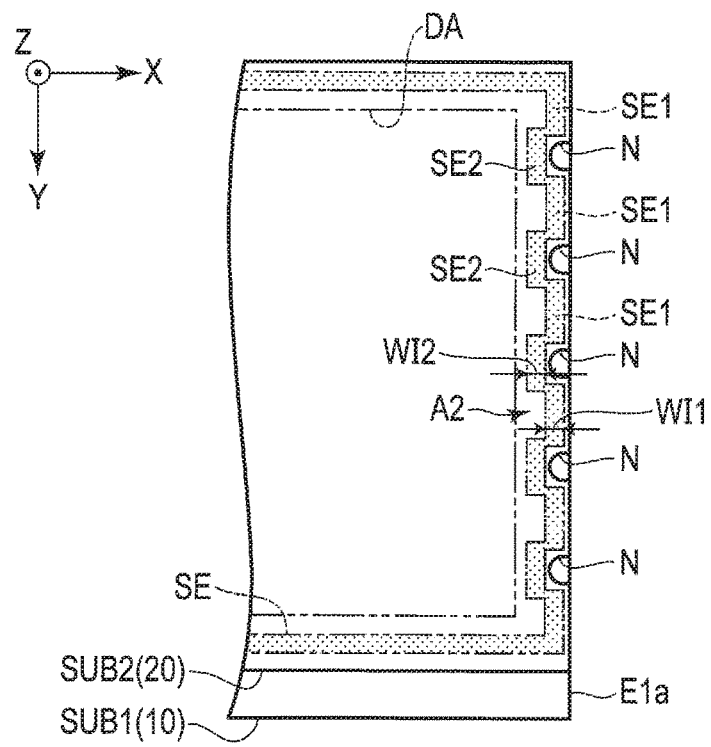
F I G. 9
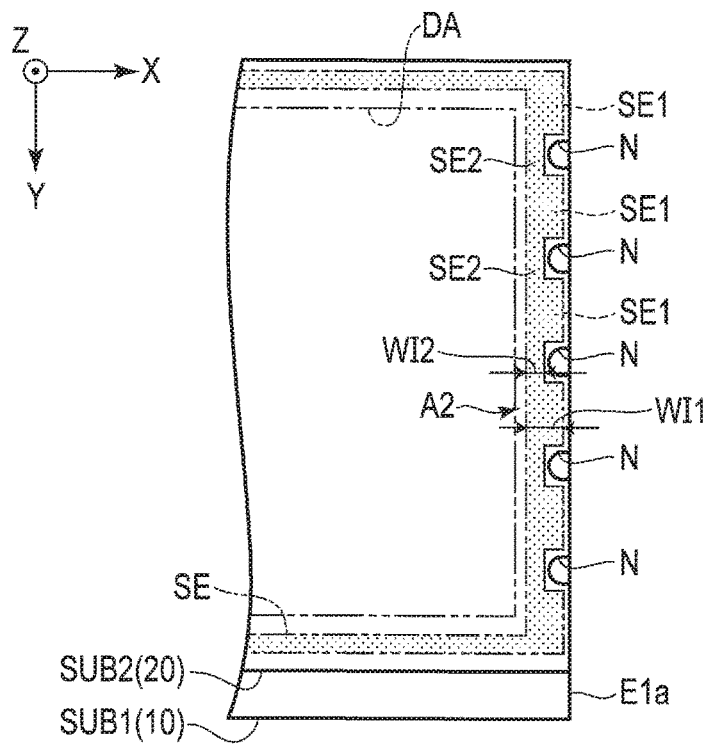
F I G. 10

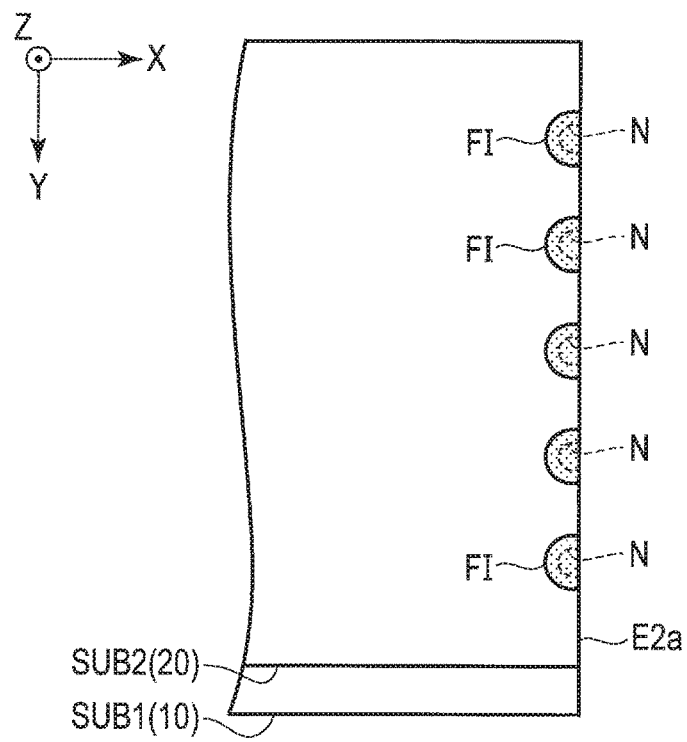
F I G. 11
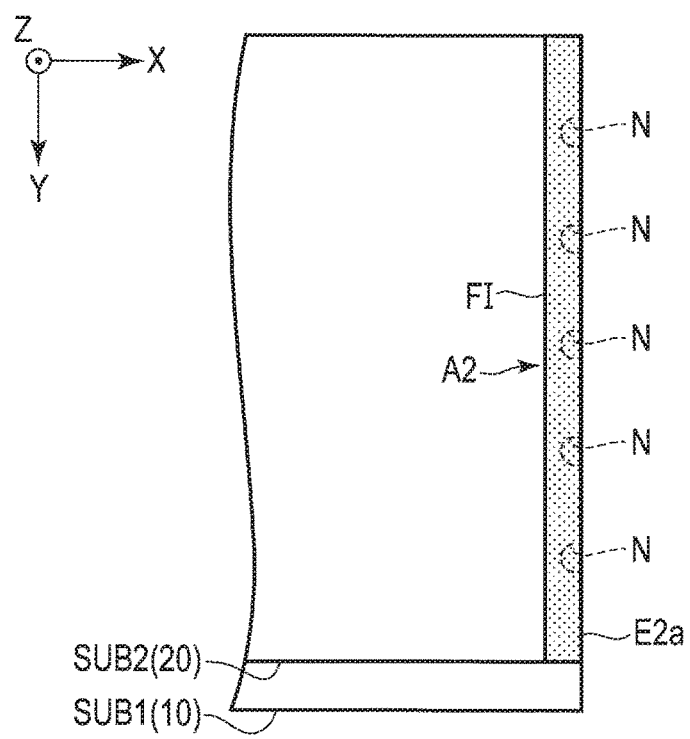
F I G. 12

DISPLAY DEVICE AND INTER-SUBSTRATE CONDUCTING STRUCTURE

CROSS-REFERENCE TO RELATED APPLICATIONS

This application is based upon and claims the benefit of priority from Japanese Patent Application No. 2017-231936, filed Dec. 1, 2017, the entire contents of which are incorporated herein by reference.

FIELD

Embodiments described herein relate generally to a display device and an inter-substrate conducting structure.

BACKGROUND

Recently, various techniques for narrowing the frame of a display device have been considered. For example, a technique for electrically connecting a wiring line which has an in-hole connector in a hole penetrating the inner surface and outer surface of a first substrate formed of resin and a wiring line which is provided on the inner surface of a second substrate formed of resin by an inter-substrate connector has been disclosed.

SUMMARY

The present application relate generally to a display device and an inter-substrate conducting structure.

According to one embodiment, a display device includes a first substrate including a first basement and a first conductive layer, a second substrate including a second basement and a second conductive layer, and a display function layer. A second end surface of the second basement includes a flat portion located in a same plane as a first end surface of the first basement, and a first concave portion formed toward an inside of the second basement with respect to the flat portion. A connecting material which electrically connects the first conductive layer and the second conductive layer is provided in the first concave portion.

BRIEF DESCRIPTION OF THE DRAWINGS

FIG. 9 is a plan view showing a part of a display device of a modified example 5 of the first embodiment.

FIG. 10 is a plan view showing a part of a display device of a modified example 6 of the first embodiment.

FIG. 11 is a plan view showing a part of a display device of a modified example 7 of the first embodiment.

FIG. 12 is a plan view showing a part of a display device of a modified example 8 of the first embodiment.

DETAILED DESCRIPTION

Figure 1:
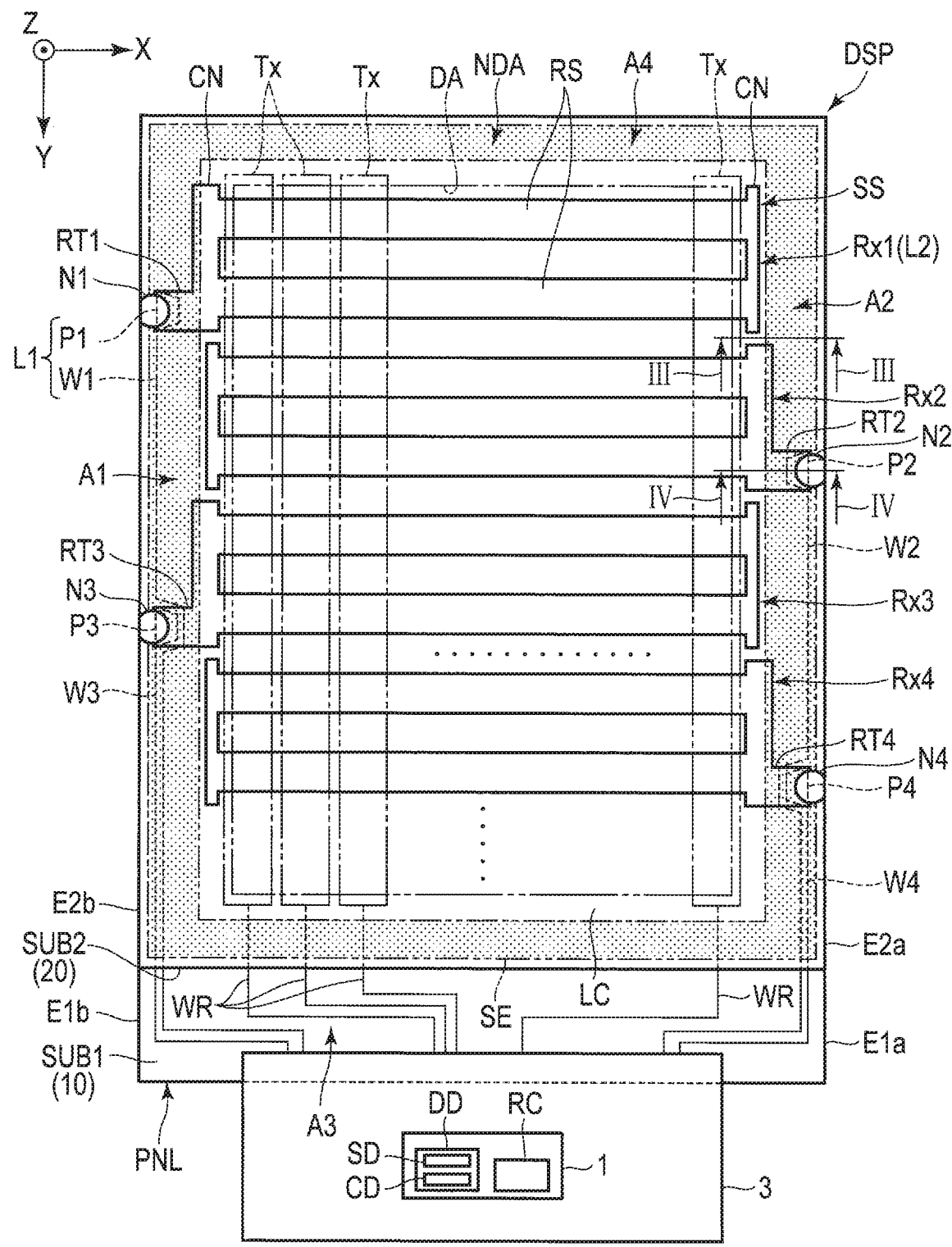
FIG. 1 is a plan view showing a configuration example of a display device of a first embodiment.

In general, according to one embodiment, there is provided a display device comprising: a first substrate comprising a first basement and a first conductive layer, the first basement including a first end surface; a second substrate comprising a second basement and a second conductive layer and opposed to the first substrate, the second basement including a second end surface; and a display function layer located between the first substrate and the second substrate. The second end surface includes a flat portion located in a same plane as the first end surface, and a first concave portion formed toward an inside of the second basement with respect to the flat portion. A connecting material which electrically connects the first conductive layer and the second conductive layer is provided in the first concave portion.

According to another embodiment, there is provided an inter-substrate conducting structure comprising: a first substrate comprising a first basement and a first conductive layer, the first basement including a first end surface; and a second substrate comprising a second basement and a second conductive layer and opposed to the first substrate, the second basement including a second end surface. The second end surface includes a flat portion located in a same plane as the first end surface, and a first concave portion formed toward an inside of the second basement with respect to the flat portion. A connecting material which electrically connects the first conductive layer and the second conductive layer is provided in the first concave portion.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in this order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

In each of the embodiments, the display device can be used in various devices such as smartphones, tablet computers, mobile phones, notebook computers and game consoles. The main structures described in each of the embodiments are applicable to liquid crystal display devices, self-luminous display devices such as organic electroluminescent display devices, electronic paper type display devices comprising electrophoresis elements, etc., display devices adopting micro-electromechanical systems (MEMS), and display device adopting electrochromism.

Each of the embodiments described below is applicable to various display devices, sensor devices and the like having an inter-substrate conducting structure in which a first basement and a second basement are disposed so as to be spaced apart from each other and a first conductive layer located in the first basement and a second conductive layer located in the second basement are electrically connected to each other via an end surface of the second basement.

First Embodiment

Firstly, the first embodiment will be described. FIG. 1 is a plan view showing an example of a display device DSP of the first embodiment. While a first direction X, a second direction Y and a third direction Z are orthogonal to each other, these directions may cross each other at an angle other than 90 degrees. The first direction X and the second direction Y correspond to directions parallel to the surfaces of basements constituting the display device DSP, and the third direction Z corresponds to the thickness direction of the display device DSP. Here, a liquid crystal display device equipped with a sensor SS will be described as an example of the display device DSP.

As shown in FIG. 1, the display device DSP comprises a display panel PNL, an IC chip 1, a circuit board (a wiring substrate) 3, a backlight unit BL which will be described later, and the like. The display panel PNL is a liquid crystal display panel and comprises a first substrate SUB1, a second substrate SUB2, a sealing member SE and a liquid crystal layer LC as a display function layer. The second substrate SUB2 is opposed to the first substrate SUB1 in the third direction Z. A portion indicated by a dot pattern in FIG. 1 corresponds to the sealing member SE. The sealing member SE has the shape of a frame and bonds the first substrate SUB1 and the second substrate SUB2 together. The liquid crystal layer LC is located in a space between the first substrate SUB1 and the second substrate SUB2 on the inside of the sealing member SE.

In the following description, a direction from the first substrate SUB1 toward the second substrate SUB2 is referred to as upward and a direction from the second substrate SUB2 toward the first substrate SUB1 is referred to as downward. Further, a view from the second substrate SUB2 toward the first substrate SUB1 is referred to as a plan view.

The display panel PNL comprises a display area DA in which an image is displayed and a non-display area NDA which is located on the outside of the display area DA. The display area DA is surrounded by the sealing member, and located inside the sealing member SE. The non-display area NDA is a frame-shaped area surrounding the display area DA and is adjacent to the display area DA. The sealing member SE is located in the non-display area NDA.

As shown in FIG. 1, the non-display area NDA includes a strip-shaped first area A1 which is located on the left side of the display area DA and extends in the second direction Y, a strip-shaped second area A2 which is located on the right side of the display area DA and extends in the second direction Y, a strip-shaped third area A3 which is located on the lower side of the display area DA, extends in the first direction X and includes an area to which the circuit board 3 is connected, and a strip-shaped fourth area A4 which is located on the upper side of the display area DA and extends in the first direction X. The end surfaces of the second substrate SUB2 are located in the same plane as the end surfaces of the first substrate SUB1 in the first area A1, the fourth area A4 and the second area A2.

The second area A2 is opposed to the first area A1 in the first direction X and is located such that the display area DA is sandwiched between the first area A1 and the second area A2. The fourth area A4 is opposed to the third area A3 in the second direction Y and is located such that the display area DA is sandwiched between the third area A3 and the fourth area A4. The circuit board 3 is coupled and physically fixed to a part of the first substrate SUB1 which belongs to the third area A3.

The first substrate SUB1 has a plate-shaped first basement 10. In FIG. 1, the first basement 10 has a first end surface E1a on the right side and a first end surface E1b on the left side. In FIG. 1, the second substrate SUB2 has a plate-shaped second basement 20. The second basement 20 has a second end surface E2a on the right side and a second end surface E2b on the left side. The first end surface E1a and the second end surface E2a on the right side are located in the same plane as each other, and the first end surface E1b and the second end surface E2b on the left side are located in the same plane as each other.

The IC chip 1 functions as a controller of the display panel PNL, the sensor SS and the like. The IC chip 1 is mounted on the circuit board 3. The IC chip 1 is not limited to the example shown in FIG. 1 but may be mounted on an area of the first substrate SUB1 which extends on the outside of the second substrate SUB2 or may be mounted on an external circuit board which is connected to the circuit board 3. For example, a display driver DD which outputs a signal necessary for displaying an image is incorporated into the IC chip 1. The display driver DD includes at least part of a signal line drive circuit SD for driving signal lines which will be described later, a scanning line drive circuit GD for driving scanning lines, and a common electrode drive circuit CD for driving common electrode which will be described later. For example, the display driver DD includes the signal line drive circuit SD and the common electrode drive circuit CD. Further, in the example shown in FIG. 1, a detection circuit RC which functions as a touch panel controller or the like is incorporated into the IC chip 1. The detection circuit RC may be incorporated into an IC chip other than the IC chip 1.

For example, the display panel PNL may be a transmissive display panel having a transmissive display function of displaying an image by selectively transmitting light from below the first substrate SUB1 or may be a reflective display panel having a reflective display function of displaying an image by selectively reflecting light from above the second substrate SUB2. Alternatively, the display panel PNL may be a transreflective display panel having the transmissive display function and the reflective display function.

The sensor SS performs sensing for detecting the contact or approach of an object with or to the display device DSP. The sensor SS is a capacitive sensor of a mutual capacitance type and detects the contact or approach of an object based on a change in electrostatic capacitance between a pair of electrodes opposed to each other via a dielectric. The sensor SS comprises a plurality of sensor drive electrodes Tx and a plurality of detection electrodes Rx (Rx1, Rx2, Rx3, Rx4 . . . ).

Each of the detection electrodes Rx comprises body portions RS which cross the display area and connecting portions CN which connect the body portions RS. Further, the detection electrodes Rx comprise terminals RT (RT1, RT2, RT3, RT4 . . . ) connected to the connecting portions CN, respectively.

The body portions RS are located in the display area DA and extend in the first direction X. The body portions RS have the shape of a strip formed of a collective entity of meshed fine metal wires. Further, a dummy area in which fine metal wires are arranged substantially in the same manner as those of the body portions RS exists between the body portions RS which are adjacent to each other. The fine metal wires of the dummy area are not connected to any wiring line and are in an electrically floating state.

Further, at least a part of each of the terminals RT is located so as to overlap the sealing member SE in a plan view. Each of the terminals RT is located in the first area A1 or the second area A2 of the non-display area NDA.

The first substrate SUB1 comprises pads P (P1, P2, P3, P4 . . . ) and wiring lines W (W1, W2, W3, W4 . . . ). The display panel PNL comprises a plurality of concavities N (N1, N2, N3, N4 . . . ). The concavities N1 and N3 are provided on the first area A1 side, the concavities N2 and N4 are provided on the second area A2 side. In a plan view, each of the concavities N has the shape of an arc and is open toward the end surface, for example.

The pads P and the wiring lines W are located in the first area A1 and the second area A2 of the non-display area NDA and overlap the sealing member SE in a plan view. The pads P are located so as to overlap the terminals RT, respectively, in a plan view. The wiring lines W are connected to the pads P, extend in the second direction Y and the first direction X and are electrically connected to the detection circuit RC of the IC chip 1 via the circuit board 3, respectively. In the present embodiment, the wiring line W1 detours the pad P3 and the concavity N3 and extends on the display area DA side of the pad P3, the wiring line W3 and the concavity N3. The wiring line W2 detours the pad P4 and the concavity N4 and extends on the display area DA side of the pad P4, the wiring line W4 and the concavity N4.

The terminals RT are located in the vicinities of the corresponding concavities N. The pads P are opposed to the corresponding concavities N in the third direction Z or are located in the vicinities of the corresponding concavities N. In the present embodiment, the concavities N and the terminals RT are provided on both the first area A1 side and the second area A2 side. However, unlike the present embodiment, the concavities N and the terminals RT may be provided on one of the first area A1 side and the second area A2 side.

The sensor drive electrodes Tx are provided in the first substrate SUB1. The detection electrodes Rx are provided in the second substrate SUB2. The sensor drive electrodes Tx and the detection electrodes Rx cross each other in the X-Y plane. For example, the sensor drive electrodes Tx have the shape of a strip extending in the second direction Y and are arranged so as to be spaced apart from each other in the first direction X. The sensor drive electrodes Tx cross the body portions RS.

The sensor drive electrodes Tx are electrically connected to the common electrode drive circuit CD via the wiring lines WR, respectively. In the present embodiment, the sensor drive electrodes Tx are formed of common electrode CE which will be described later. Each of the sensor drive electrodes Tx has the function of producing an electric field between a pixel electrode PE and itself and the function of detecting the position of an object by producing a capacitance between the detection electrode Rx and itself.

The common electrode drive circuit CD supplies a common signal to the sensor drive electrodes Tx (the common electrode CE) in a display period in which an image is displayed in the display area DA. In the display period, the signal line drive circuit SD supplies an image signal to pixel electrodes PE which will be described later. Further, the common electrode drive circuit CD supplies a sensor drive signal to the sensor drive electrodes Tx in a sensing period (touch period) in which sensing is performed. As the sensor drive signal is supplied to each of the sensor drive electrodes Tx, each of the detection electrodes Rx outputs a sensor signal necessary for sensing, that is, a signal based on a change in capacitance between the sensor drive electrode Tx and the detection electrode Rx. The detection circuit RC shown in FIG. 1 is electrically connected to each of the detection electrodes Rx of a second conductive layer L2 via a first conductive layer L1 and a connecting material C which will be described later, and reads the sensor signal output from each of the detection electrodes Rx.

The sensor SS is not limited to a sensor of a mutual capacitance type which detects an object based on a change in electrostatic capacitance between the sensor drive electrode Tx and the detection electrode Rx but may be a sensor of a self capacitance type which detects an object based on a change in capacitance of the detection electrode Rx itself. Alternatively, sensing of two types may be performed in a time-sharing manner.

Figure 2:
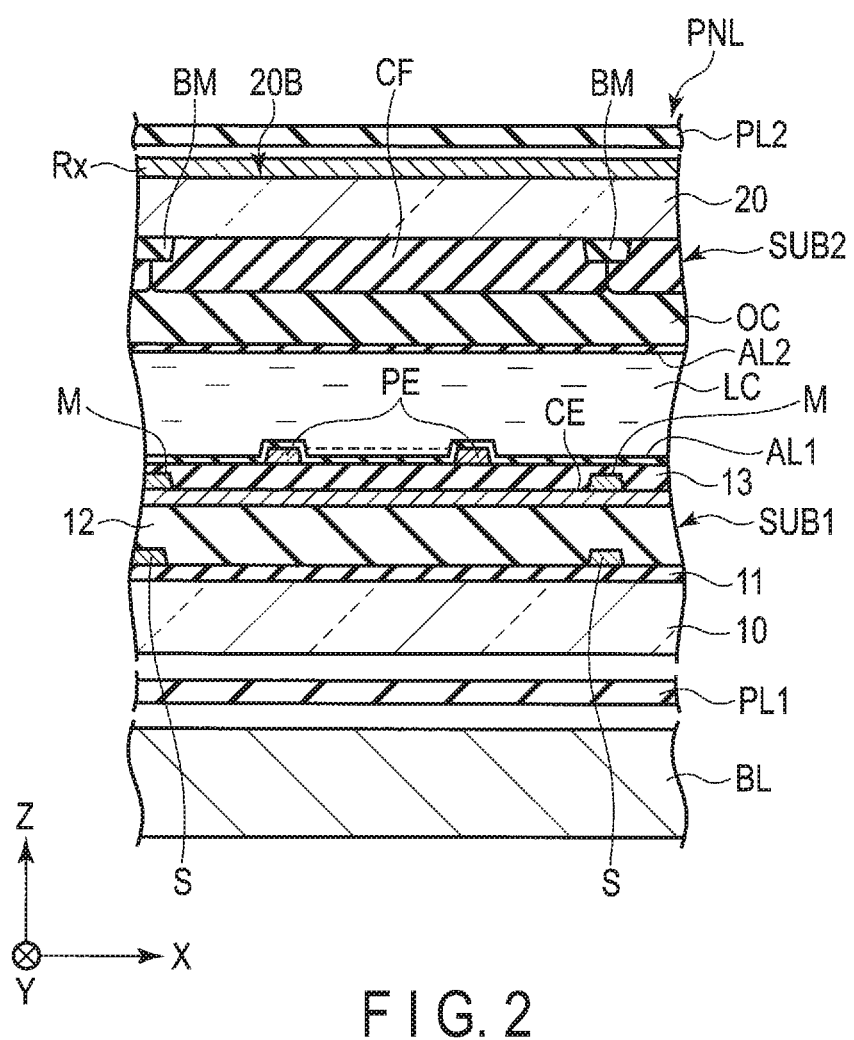
FIG. 2 is a sectional view showing a display area of a display panel shown in FIG. 1.

FIG. 2 is a sectional view of the display device DSP taken in the first direction X in the display area DA. In the example shown in FIG. 2, the display panel PNL has a structure conforming to a display mode which mainly uses a lateral electric field substantially parallel to the X-Y plane. The display panel PNL may have a structure conforming to a display mode which uses a longitudinal electric field perpendicular to the X-Y plane, an electric field inclined with respect to the X-Y plane or a combination of these electric fields.

As shown in FIG. 2, the first substrate SUB1 comprises the first basement 10, and on the upper surface (third surface) of the first basement 10, a first insulating layer 11, signal lines S, a second insulating layer 12, the common electrode CE, metal layers M, a third insulating layer 13, the pixel electrode PE, a first alignment film AL and the like are stacked in this order.

In FIG. 2, switching elements, scanning lines, various insulating layers interposed therebetween and the like are omitted.

The second substrate SUB2 comprises the second basement 20, light-shielding layers BM, color filter CF, an overcoat layer OC, a second alignment film AL2 and the like. The light-shielding layers BM, the color filter CF, the overcoat layer OC and the second alignment film AL2 are stacked in this order on the lower surface (first surface) of the second basement 20. On the other hand, the detection electrode Rx is formed on the upper surface of the second basement 20.

A first polarizer PL1 is located between the first basement 10 and the backlight unit BL. A second polarizer PL2 is located above the detection electrode Rx provided on the second basement 20.

Figure 3:
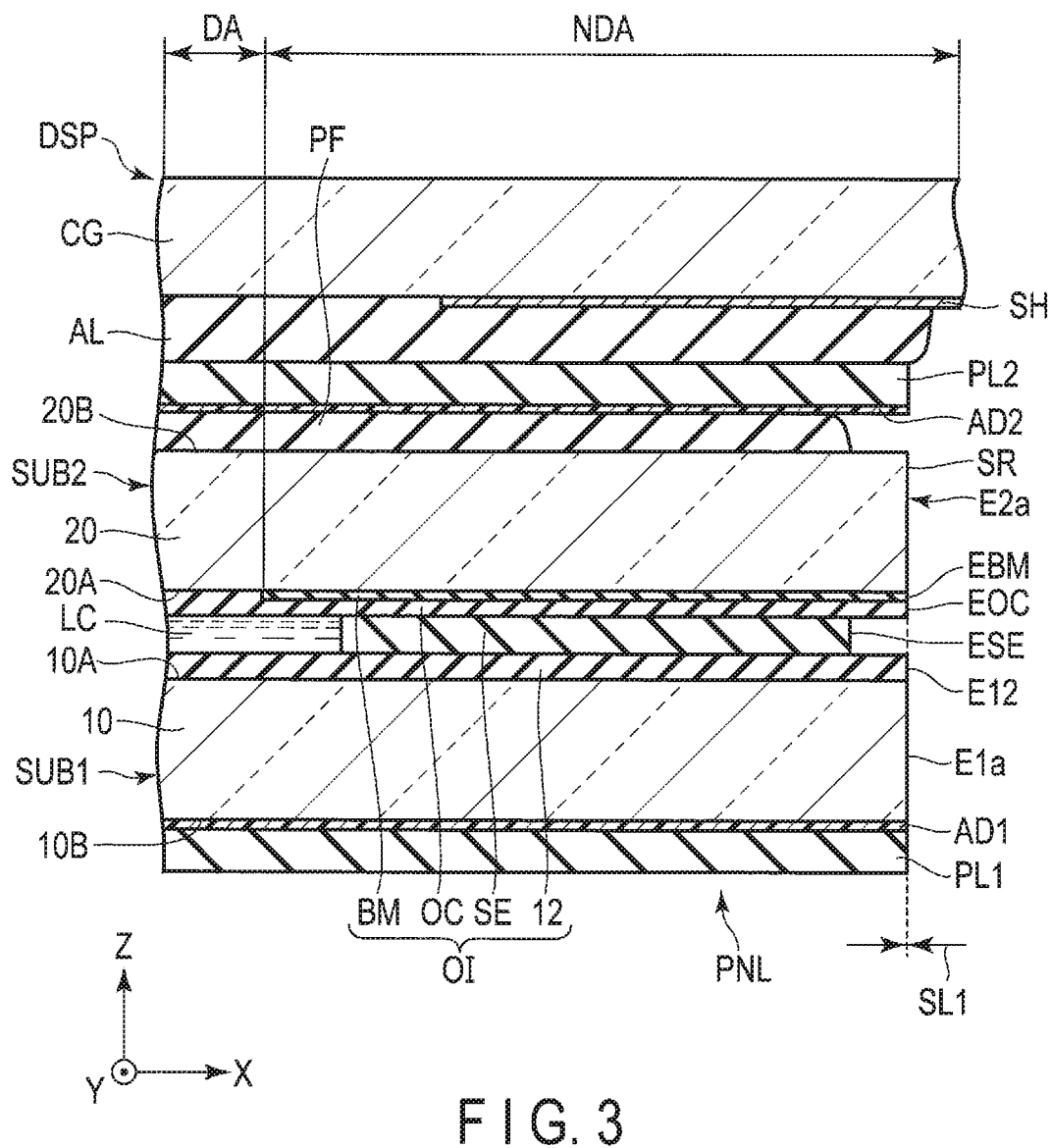
FIG. 3 is a sectional view of the display device taken along line of FIG. 1 and shows an area deviated from a concavity.

Next, the structure of the end of the display device DSP will be described. FIG. 3 is a sectional view of the display device DSP along line of FIG. 1 and shows an area deviated from a concavity N.

As shown in FIG. 3, the display device DSP comprises the first substrate SUB1, the second substrate SUB2, an organic insulating layer OI, the connecting material C, the first polarizer PL1, the second polarizer PL2 and a cover member CG.

The second basement 20 has a first surface 20A which is opposed to the first substrate SUB1 and a second surface 20B which is opposite to the first surface 20A. The first basement 10 has a third surface 10A which is opposed to the first surface 20A and a fourth surface 10B which is opposite to the third surface 10A. The first polarizer PL1 is opposed to the fourth surface 10B and is bonded to the first substrate SUB1 by an adhesive layer AD1. The second polarizer PL2 is opposed to the second surface 20B and is bonded to the second substrate SUB2 by an adhesive layer AD2.

Incidentally, it is possible to see that the organic insulating layer OI formed of a plurality of insulating layers, etc., is located between the first basement 10 and the second basement 20. For example, the organic insulating layer OI includes the sealing member SE, the second insulating layer 12 of the first substrate SUB1, the light-shielding layer BM and the overcoat layer OC of the second substrate SUB2 and the like.

The second end surface E2a of the second basement 20 comprises a first concave portion Na which will be described later, and a flat portion SR which is an area other than the first concave portion Na. The flat portion SR of the second end surface E2a is located in the same plane as the first end surface E1a of the first basement 10. In other words, the flat portion SR is aligned with the first end surface E1a. Here, when the flat portion SR is aligned with the first end surface E1a, an amount of deviation SL1 between the flat portion SR and the first end surface E1a in the first direction X is less than 100 μm. In the present embodiment, an end surface EBM of the light-shielding layer BM, an end surface EOC of the overcoat layer OC and an end surface E12 of the second insulating layer 12 are also aligned with the first end surface E1a in the third direction Z. An end surface ESE of the sealing member SE is located on the display area DA side of the flat portion SR.

Figure 4:
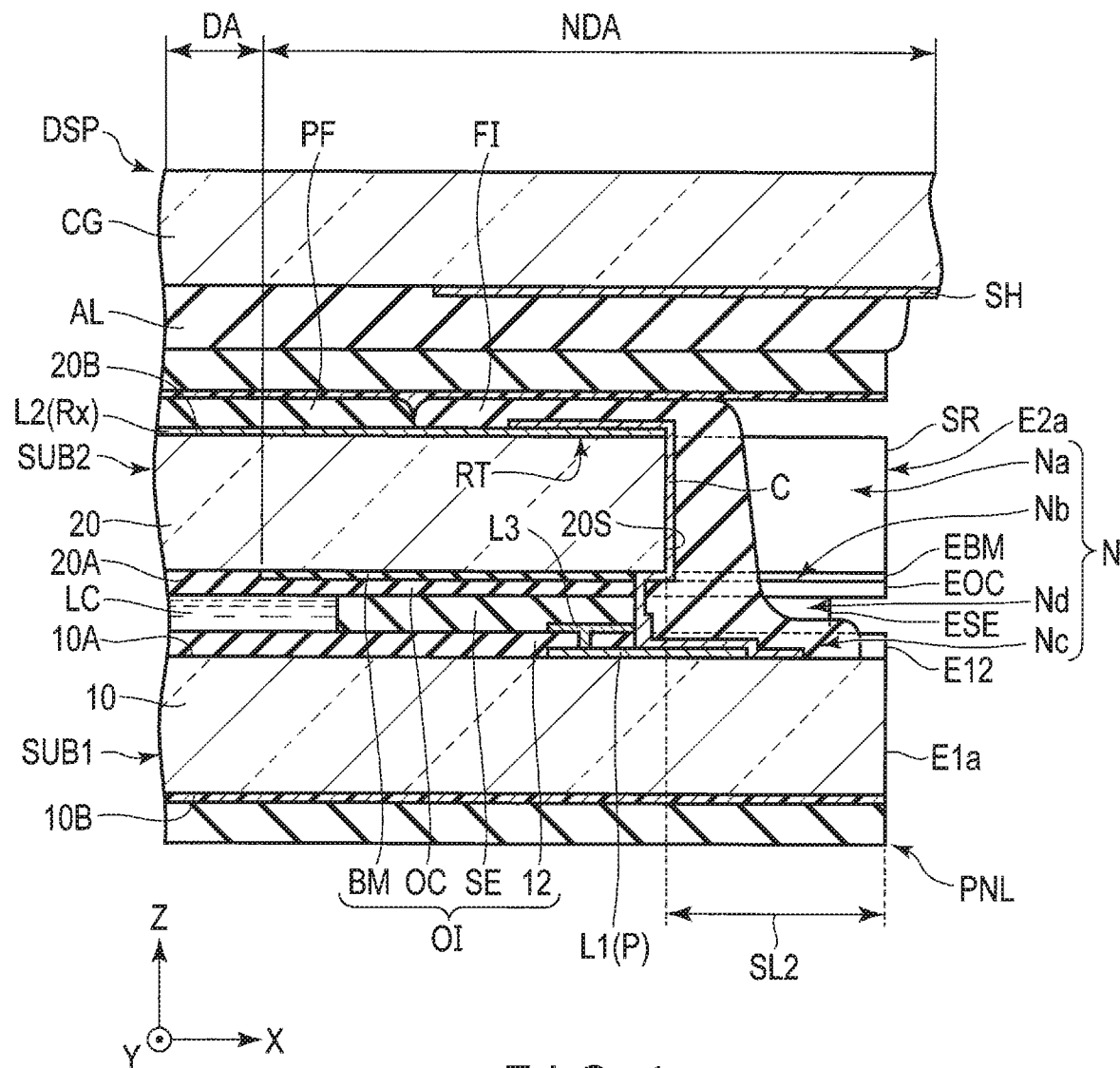
FIG. 4 is a sectional view of the display device taken along line IV-IV of FIG. 1 and shows an area passing through the concavity.

FIG. 4 is a sectional view of the display device DSP along line IV-IV of FIG. 1 and shows an area passing through the concavity N.

As shown in FIG. 4, the first substrate SUB1 comprises the previously-described first basement 10 and the first conductive layer L1. The first conductive layer L1 includes the previously-described pad P and wiring line W and is located on the third surface 10A side of the first basement 10. The first insulating layer 11 shown in FIG. 2 and other insulating layers and other conductive layers may be disposed between the first basement 10 and the pad P and between the first basement 10 and the second insulating layer 12.

The second substrate SUB2 comprises the previously-described second basement 20 and the second conductive layer L2. The first surface 20A of the second basement 20 is located so as to be separated from the first conductive layer L1 in the third direction Z. The second conductive layer L2 includes the previously-described detection electrode Rx. The second conductive layer L2 is located on the second surface 20B side and is covered with a protection layer PF. In other words, the first basement 10, the first conductive layer L1, the second basement 20, the second conductive layer L2 and the protection layer PF are arranged in this order in the third direction Z.

While the organic insulating layer OI is located between the first conductive layer L1 and the second basement 20, this is in no way restrictive, and an inorganic insulating layer, a conductive layer, an air layer or the like may be located instead. Various insulating layers and various conductive layers may be disposed between the second basement 20 and the second conductive layer L2 or on the second conductive layer L2.

The third conductive layer L3, and the third insulating layer 13 and the first alignment film AL1 which are shown in FIG. 2 may be interposed between the second insulating layer 12 and the sealing member SE. The second alignment film AL2 shown in FIG. 2 may be interposed between the overcoat layer OC and the sealing member SE.

In the present embodiment, the third conductive layer L3 is interposed between the second insulating layer 12 and the sealing member SE. For example, the third conductive layer L3 is formed of the same material as and formed concurrently with the above-described metal layer M. The third conductive layer L3 is electrically connected to the first conductive layer L1. In the example shown in FIG. 4, the third conductive layer L3 is in contact with the first conductive layer L1 via a contact hole formed in the second insulating layer 12.

The first and second basements 10 and 20 are formed of an insulating material such as glass or resin. The protection layer PF is formed of, for example, an organic insulating material such as acrylic resin. The first and second conductive layers L1 and L2 are formed of, for example, a metal material such as molybdenum, tungsten, titanium, aluminum, silver, copper or chromium, an alloy containing these metal materials, a transparent conductive material such as indium gallium oxide (IGO), indium tin oxide (ITO) or indium zinc oxide (IZO). The first and second conductive layers L1 and L2 may have a single-layer structure or may have a multilayer structure. In the present embodiment, the first conductive layer L1 is formed by stacking titanium, aluminum and titanium in this order, and the second conductive layer L2 is formed by stacking molybdenum, aluminum, molybdenum and the transparent conductive material in this order.

The concavity N has the first concave portion Na, a second concave portion Nb and a third concave portion Nc which are arranged in the third direction Z. The second basement 20 has the first concave portion Na. The first concave portion Na is formed toward the inside of the second basement 20 with respect to the flat portion SR. In other words, the first concave portion Na is formed toward the liquid crystal layer LC side with respect to the flat portion SR.

As shown in FIGS. 1 and 4, each of the first concave portions Na is provided on one of the first area A1 side and the second area A2 side of the second basement 20.

As shown in FIG. 4, in the second substrate SUB2, the insulating layer (multilayer structure of the light-shielding layer BM and the overcoat layer OC) located between the second basement 20 and the sealing member SE has the second concave portion Nb. The second concave portion Nb is formed in the end surfaces EBM and EOC and is opposed to the first concave portion Na in the third direction Z. The second concave portion Nb is followed toward the liquid crystal layer LC side with respect to the end surfaces EBM and EOC.

In the first substrate SUB1, the insulating layer (second insulating layer 12) located between the first conductive layer L1 and the sealing member SE has the third concave portion Nc. The third concave portion Nc is formed in the end surface E12 and is opposed to the first concave portion Na and the second concave portion Nb in the third direction Z. The third concave portion Nc is formed toward the liquid crystal layer LC side with respect to the end surface E12.

In the present embodiment, the concavity N further has a fourth concave portion Nd. The sealing member SE has the fourth concave portion Nd. The fourth concave portion Nd is formed in the end surface ESE and is located between the second concave portion Nb and the third concave portion Nc. The fourth concave portion Nd is formed toward the liquid crystal layer LC side with respect to the end surface ESE. In the present embodiment, the first concave portion Na, the second concave portion Nb, the fourth concave portion Nd and the third concave portion Nc are hollowed in the shape of an arc and communicate with each other.

The above-described concavity N can be formed by using a laser, and a laser beam can be emitted from above the second conductive layer L2. For example, a carbon dioxide laser or the like can be employed as the laser, but any laser which can form a hole in the second end surface E2a of the second basement 20 can be employed as the laser, and an excimer laser or the like can also be employed as the laser.

By emitting such a laser beam, the first concave portion Na is formed in the second basement 20. On this occasion, a portion of the second conductive layer L2 which is opposed to the first concave portion Na also sublimes with the second basement 20. Further, when the above-described laser beam is emitted, the second concave portion Nb, i.e., a portion of the end surfaces EBM and EOC which is hollowed toward the liquid crystal layer LC side, the fourth concave portion Nd, i.e., a portion of the end surface ESE which is hollowed toward the liquid crystal layer LC side, and the third concave portion Nc, i.e., a portion of the end surface E12 which is hollowed toward the liquid crystal layer LC side are also concurrently formed directly below the first concave portion Na. As a result, the concavity N for connecting the first conductive layer L1 and the second conductive layer L2 is formed.

When thermal energy is given to the display panel PNL by laser beam irradiation, materials used for the second insulating layer 12, the sealing member SE, the overcoat layer OC and the light-shielding layer BM sublime more easily than materials used for the second basement 20 and the third conductive layer L3. Therefore, as described above, the second concave portion Nb, the third concave portion Nc and the fourth concave portion Nd are larger than the first concave portion Na.

As shown in FIGS. 1 and 4, for example, the sealing member SE extends so as to detour the first concave portion Na. In the present embodiment, the fourth concave portion Nd is formed when the sealing member SE is irradiated with the laser beam and the sealing member SE is partially removed.

The second conductive layer L2 does not exist at a position overlapping the first concave portion Na. The first conductive layer L1 has an upper surface and a side surface which are not covered with the organic insulating layer OI in the concavity N. The third conductive layer L3 has an arc-shaped portion which is not covered with the second insulating film 12 and the sealing member SE. The reason is because a material used for the organic insulating layer OI sublimes more easily than a material used for the third conductive layer L3 in the laser beam irradiation.

The connecting material C is disposed in the concavity N. The connecting material C and the layers formed in the concavity N, that is, the first substrate SUB1, the second substrate SUB2 and the organic insulating layer OI constitute an inter-substrate conducting structure according to the present embodiment. The connecting material C should preferably contain, for example, a metal material such as silver and contain a metal material in which fine particles of the metal material whose particle diameter is of the order of several nanometers to several tens of nanometers are mixed in a solvent. The above-described material is the so-called nanometal. Other than that, the connecting material C may contain a metal material such as silver or copper and contain a metal material in which fine particles of the metal material whose particle diameter is of the order of several hundreds of nanometers to several micrometers are mixed in a solvent. The above-described material is the so-called metal paste. After the connecting material is provided in the concavity N, the solvent evaporates, and basically, only the metal material (or a thin film of the metal material) is attached to a wall portion of the concavity N, etc.

The connecting material C electrically connects the first conductive layer L1 and the second conductive layer L2, which are provided respectively in different substrates, via the concavity N (the first concave portion Na, the second concave portion Nb, the fourth concave portion Nd and the third concave portion Nc). Here, the connecting material C is electrically connected to the terminal RT.

The connecting material C covers the second conductive layer L2, a wall surface 20S of the second basement 20 in the first concave portion Na, wall surfaces of the light-shielding layer BM and the overcoat layer OC in the second concave portion Nb, a wall surface of the sealing member SE in the fourth concave portion Nd, the third conductive layer L3, a wall surface of the second insulating layer 12 in the third concave portion Nc, the first conductive layer L1, and the like. Further, the connecting material C is located above the second surface 20B.

In the example shown in FIG. 4, the concavity N is not completely filled with the connecting material C. More specifically, the connecting material C only covers the wall surface 20S and the like in the form of a film, and the film is thin.

To fill the hollow of the concavity N, the space surrounded by the concavity N (the first concave portion Na, the second concave portion Nb, the fourth concave portion Nd and the third concave portion Nc) is filled with a filling material FI. The filling material FI covers the connecting material C. The filling material FI is formed of, for example, a material similar to that of the protection layer PF.

The connecting material C is formed continuously between the first conductive layer L1 and the second conductive layer L2 without interruption. The second conductive layer L2 is thereby connected to the first conductive layer L1 via the connecting material C. As a result, the second conductive layer L2 is electrically connected to the previously-described circuit board 3 via the connecting material C and the first conductive layer L1.

As shown in FIGS. 3 and 4, the cover member CG is formed over the display area DA and the non-display area NDA and covers the entire surface of the display panel PNL. A light-shielding layer SH is formed on a surface of the cover member CG which is opposed to the display panel PNL. The light-shielding layer SH is provided in the non-display area NDA. The cover member CG is bonded to the second polarizer PL2 by an adhesive layer AL. For example, the adhesive layer AL is formed of optically clear resin (OCR). The adhesive layer AL has a substantially uniform thickness over the entire area thereof.

The light-shielding layer SH covers the concavity N, the connecting material C and the like.

According to the display device DSP of the first embodiment constituted as described above, the detection electrodes Rx provided in the second substrate SUB2 are connected to the pads P provided in the first substrate SUB1 by the connecting materials C provided in the concavities N, respectively. Therefore, it is no longer necessary to mount a circuit board for connecting the detection electrodes Rx and the detection circuit RC on the second substrate SUB2.

The connecting materials C are not intended to be connected to the pads P via holes formed in the display panel PNL. In that case, a hole which is completely enclosed around the entire circumference will be filled with the connecting material C, and therefore air bubbles may remain in the hole. In the present embodiment, since the concavity N which is not completely enclosed around the entire circumference is filled with the connecting material C, the risk of air bubbles remaining in the space surrounded by the concavity N can be reduced.

Further, in the case of forming a hole in the display panel PNL, the hole needs to be formed at a position away from the end surface (such as the flat portion SR) of the display panel PNL. The reason is to secure the strength of a portion of the display panel PNL between the hole and the end surface and to secure a margin area from the end surface to the hole of the display panel PNL by taking a positional deviation of the hole, etc., into consideration. Therefore, formation of a hole at a position away from the end surface of the display panel PNL is disadvantageous to narrowing of a frame.

On the other hand, since an inter-substrate conductor can be formed in the concavity N in the present embodiment, the present embodiment does not require consideration of a margin area and can contribute to narrowing of a frame.

Further, the material of the connecting material C may be any material which can fill the concavity N, and therefore the material of the connecting material C is not limited to nanometal but may be metal paste. When the connecting material C is formed by using metal paste, the manufacturing cost can be reduced.

The display device DSP comprising a highly-reliable inter-substrate connector can be thereby obtained.

Deviation of the positions of the concavities N in the first direction X due to the positions of the pads P is acceptable. In this case, the size of the opening plane toward the end surface of the display panel PNL in the concavity N varies according to the position of the pad P. Further, it is also possible to handle deviation of the positions of the pads P without changing the positions of the concavities N in the first direction X by making one concavity N larger than another concavity N.

Modified Example 1 of First Embodiment

Figure 5:
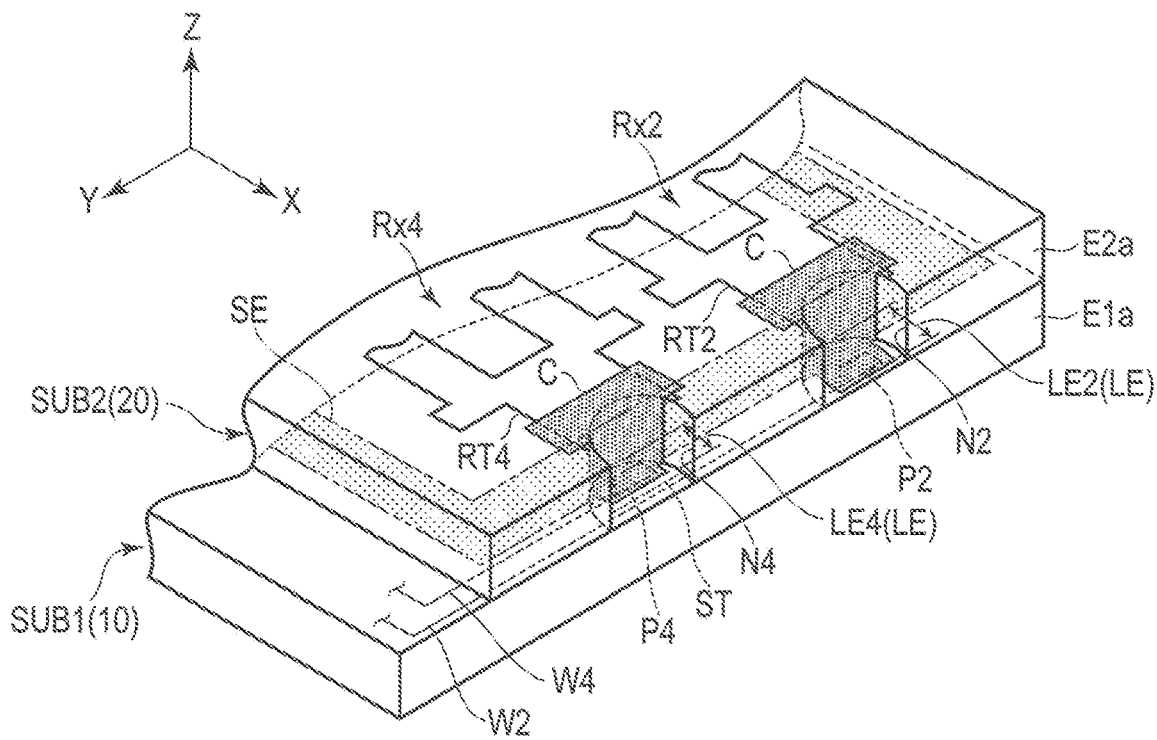
FIG. 5 is a perspective view showing a part of a display device of a modified example 1 of the first embodiment.

Next, a modified example 1 of the first embodiment will be described. The display device DSP of the present modified example 1 is different from the above-described first embodiment in the position of the pad but the same as the above-described first embodiment in the other structures. Therefore, the same structures as those of the above-described first embodiment will be denoted by the same reference numbers, and description thereof will be omitted. FIG. 5 is a perspective view showing a part of the display device DSP of the modified example 1 of the above-described first embodiment.

As shown in FIG. 5, the wiring line W2 extends in an area on the first end surface E1a side of the wiring line W4. The wiring lines W are provided in an area on the first end surface E1a side (on the outside) of the sealing member SE in the present modified example 1 but may be provided at a position overlapping the sealing member SE instead. In the present modified example 1, the pad P2 is located on the first end surface E1a side of the pad P4. Of the connecting materials C connected respectively to the pads P, when lengths LE of portions located on the first substrate SUB1 in the first direction X are compared with each other, a length LE2 in the pad P2 is greater than a length LE4 in the pad P4.

The wiring line W2 does not detour the pad P4 and the concavity N4 and passes through an area surrounded by the concavity N4. The wiring lines W located in the respective concavities N are also covered with the above-described filling materials FI.

Further, in the present modified example, the wiring line W2 extending from the pad P2 passes on the outside of the pad P4. When the connecting material C is provided on the pad P4 and if the connecting material C contacts the wiring line W2 extending from the pad P2, this causes a defect. From this perspective, as indicated by a dotted line in the drawing, a stopper ST which prevents an outflow of the connecting material C may be provided between the pad P4 and the wiring line W2. Either a groove or a projection can be employed as the stopper.

Also in the modified example 1 of the first embodiment constituted as described above, advantages similar to those of the first embodiment can be obtained.

Modified Example 2 of First Embodiment

Figure 6:
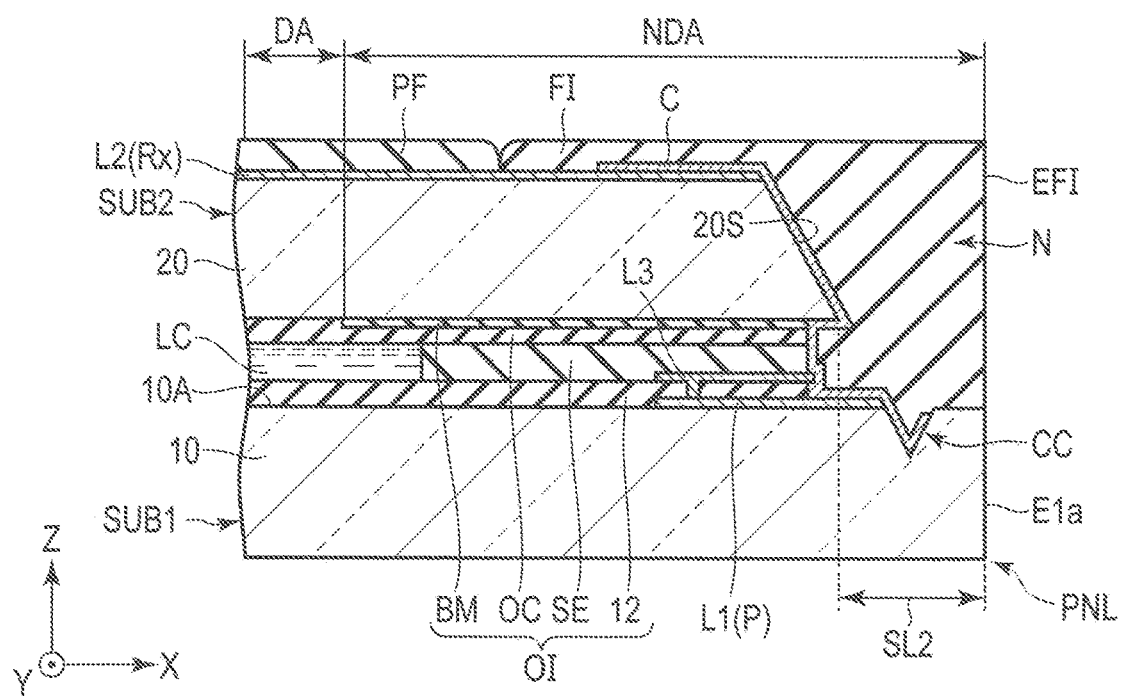
FIG. 6 is a sectional view showing a part of a display device of a modified example 2 of the first embodiment.

Next, a modified example 2 of the first embodiment will be described. The display device DSP of the present modified example 2 is different from the above-described first embodiment in the shapes of the concavity N and the filling material FI but the same as the above-described first embodiment in the other structures. Therefore, the same structures as those of the above-described first embodiment will be denoted by the same reference numbers, and description thereof will be omitted. FIG. 6 is a sectional view showing a part of the display device DSP of the modified example 2 of the above-described first embodiment.

As shown in FIG. 6, the wall surface 20S is inclined with respect to the third direction Z. The wall surface 20S which is inclined as described above can be obtained, for example, by emitting a Gaussian laser beam to the second basement 20. The first basement 10 has a concavity CC. The concavity CC is located directly below the concavity N. The concavity CC is formed, for example, by laser beam irradiation together with the concavity N.

The filling material FI has an end surface EFI aligned with the first end surface E1a in the third direction Z. It is possible to fill a greater part of the space surrounded by the concavity N with the filling material FI. Therefore, the strength of the display panel PNL can be increased.

Also in the modified example 2 of the first embodiment constituted as described above, advantages similar to those of the first embodiment can be obtained.

Modified Example 3 of First Embodiment

Figure 7:
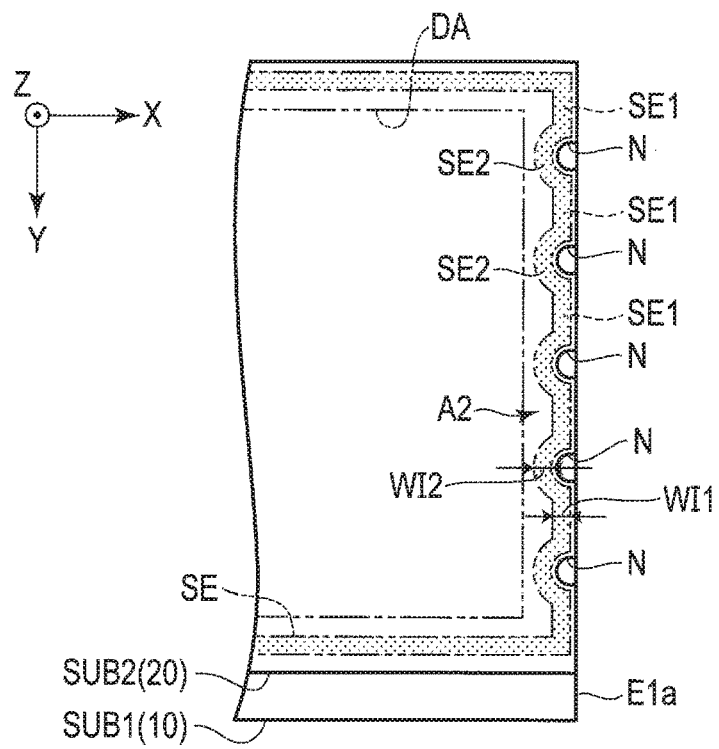
FIG. 7 is a plan view showing a part of a display device of a modified example 3 of the first embodiment.

Next, a modified example 3 of the first embodiment will be described. The display device DSP of the present modified example 3 is different from the above-described first embodiment in the shape of the sealing member SE but the same as the above-described first embodiment in the other structures. Therefore, the same structures as those of the above-described first embodiment will be denoted by the same reference numbers, and description thereof will be omitted. FIG. 7 is a plan view showing a part of the display device DSP of the modified example 3 of the above-described first embodiment.

As shown in FIG. 7, the sealing member SE has a plurality of strip-shaped first sealing portions SE1 extending linearly in the second direction Y and a plurality of second sealing portions SE2, in the second area A2 in which the concavities N are disposed. Although not shown in the drawing, the sealing member SE has the first sealing portions SE1 and the second sealing portions SE2 also in the above-described first area A1 in which the concavities N are disposed.

The first sealing portions SE1 are arranged alternately with the concavities N in the second direction Y. The second sealing portions SE2 have the shape of an arc, detour the concavities N and are located on the display area DA side of the concavities N, respectively. The end surfaces of the second sealing portions SE2 on the display area DA side are farther from the first end surface E1a than the end surfaces of the first sealing portions SE1 on the display area DA side. The second sealing portions SE2 are preliminarily formed in the shape of an arc so as to detour areas in which the concavities N are to be formed, respectively. Therefore, the sealing member SE is not directly irradiated with the above-described laser beam. Consequently, the sealing member SE will not be partially cut off or changed in form and quality along with the process of forming the above-described concavities N.

A width WI1 of the first sealing portions SE1 and a width WI2 of the second sealing portions SE2 are the same as each other. The width WI1 is a length of the first sealing portions SE1 in a direction orthogonal to an axis in the second direction Y in which the first sealing portions SE1 extend. The width WI2 is a length of the second sealing portions SE2 in a direction orthogonal to the axis of the shape of an arc in which the second sealing portions SE2 extend. Even if the concavities N are formed, reduction of the area of the second sealing portions SE2 in a plan view can be limited. Accordingly, reduction of adhesion between the first substrate SUB1 and the second substrate SUB2 by the second sealing portions SE2 can be limited. Therefore, the display panel PNL in which peeling is less likely to occur can be obtained. Also, the highly-reliable display panel PNL can be obtained.

Also in the modified example 3 of the first embodiment constituted as described above, advantages similar to those of the first embodiment can be obtained.

Modified Example 4 of First Embodiment

Figure 8:
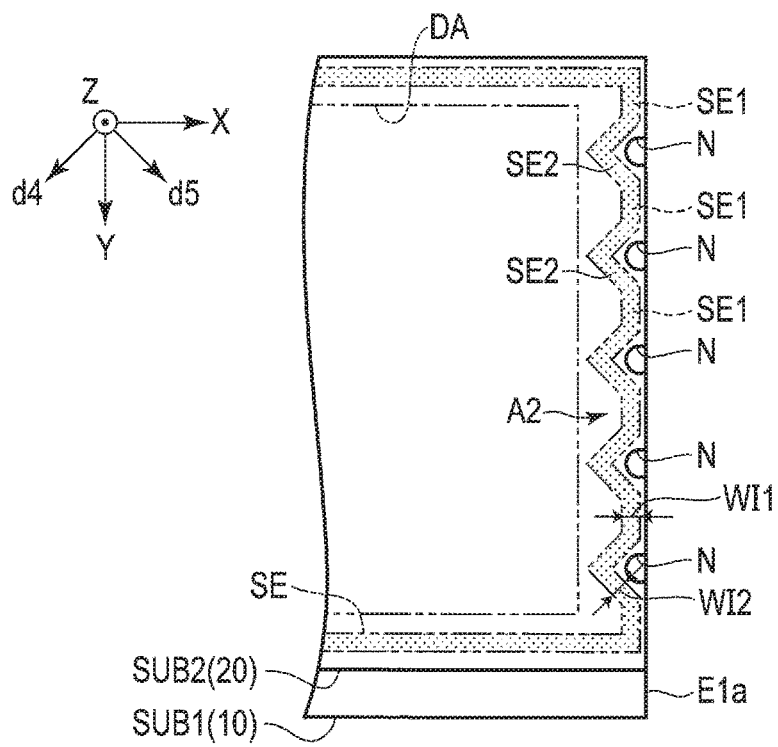
FIG. 8 is a plan view showing a part of a display device of a modified example 4 of the first embodiment.

Next, a modified example 4 of the first embodiment will be described. The display device DSP of the present modified example 4 is different from the above-described modified example 3 in that the second sealing portions SE2 have a bent shape but is the same as the above-described first embodiment in the other structures. Therefore, the same structures as those of the above-described first embodiment will be denoted by the same reference numbers, and description thereof will be omitted. FIG. 8 is a plan view showing a part of the display device DSP of the modified example 4 of the above-described first embodiment.

As shown in FIG. 8, the sealing portions SE2 have a bent shape. Each of the second sealing portions SE2 includes a strip-shaped extending portion which extends in a fourth direction d4 different from the first direction X and the second direction Y, and a strip-shaped extending portion which extends in a fifth direction d5 different from the first direction X, the second direction Y and the fourth direction d4. The second sealing portions SE2 are preliminary bent so as to detour areas in which the concavities N are to be formed, respectively.

Also in the modified example 4 of the first embodiment constituted as described above, advantages similar to those of the modified example 3 can be obtained. The width WI1 of the first sealing portions SE1 and the width WI2 of the second sealing portions SE2 are the same as each other. The width WI2 is a length in a direction orthogonal to the fourth direction d4 of the extending portions which extend in the fourth direction d4, and a length in a direction orthogonal to the fifth direction d5 of the extension portions which extend in fifth direction d5. Therefore, reduction of adhesion between the first substrate SUB1 and the second substrate SUB2 by the second sealing portions SE2 can be limited.

Modified Example 5 of First Embodiment

Next, a modified example 5 of the first embodiment will be described. The display device DSP of the present modified example 5 is different from the above-described modified examples 3 and 4 in that the first sealing portions SE1 and the second sealing portion SE2 are arranged in a staggered manner but is the same as the above-described first embodiment in the other structures. Therefore, the same structures as those of the above-described first embodiment will be denoted by the same reference numbers, and description thereof will be omitted. FIG. 9 is a plan view showing a part of the display device DSP of the modified example 5 of the above-described first embodiment.

As shown in FIG. 9, the second sealing portions SE2 are located between the concavities N and the display area DA, have the shape of a rectangle in a plan view, and are connected to the first sealing portions SE1 at upper and lower ends thereof, respectively. In the present modified example 5, the width WI1 of the first sealing portions SE1 in the first direction X and the width WI2 of the second sealing portions SE2 in the first direction X are the same as each other. The sealing member SE is preliminarily formed so as to detour areas in which the concavities N are to be formed.

Also in the modified example 5 of the first embodiment constituted as described above, advantages similar to those of the modified example 3 can be obtained.

Modified Example 6 of First Embodiment

Next, a modified example 6 of the first embodiment will be described. As shown in FIG. 10, the display device DSP of the present modified example 6 is different from the above-described modified example 5 in that the width of the first sealing portions SE1 and the width of the second sealing portions SE2 are different from each other (WI2<WI1) but is the same as the above-described first embodiment in the other structures.

Also in the modified example 6 of the first embodiment constituted as described above, advantages similar to those of the modified example 3 can be obtained.

Modified Example 7 of First Embodiment

Next, a modified example 7 of the first embodiment will be described. In the display device DSP of the present modified example 7, the filling materials FI are provided individually in the concavities N. FIG. 11 is a plan view showing a part of the display device DSP of the modified example 7 of the above-described first embodiment.

As shown in FIG. 11, the filling material FI is provided independently in each of the concavities N. The strength of the display panel PNL can also be increased by the filling materials FI of the modified example 7.

Modified Example 8 of First Embodiment

Next, a modified example 8 of the first embodiment will be described. In the display device DSP of the present modified example 8, the filling material FI is shared among the concavities N. FIG. 12 is a plan view showing a part of the display device DSP of the modified example 8 of the above-described first embodiment.

As shown in FIG. 12, the filling material FI extends linearly in the second direction Y in the second area A2, has the shape of a strip, and fills all the concavities N located in the second area A2. As compared to the above-described modified example 7, the area in which the filling material FI is disposed is large. Therefore, the strength of the display panel PNL can be further increased.

Second Embodiment

Figure 13:
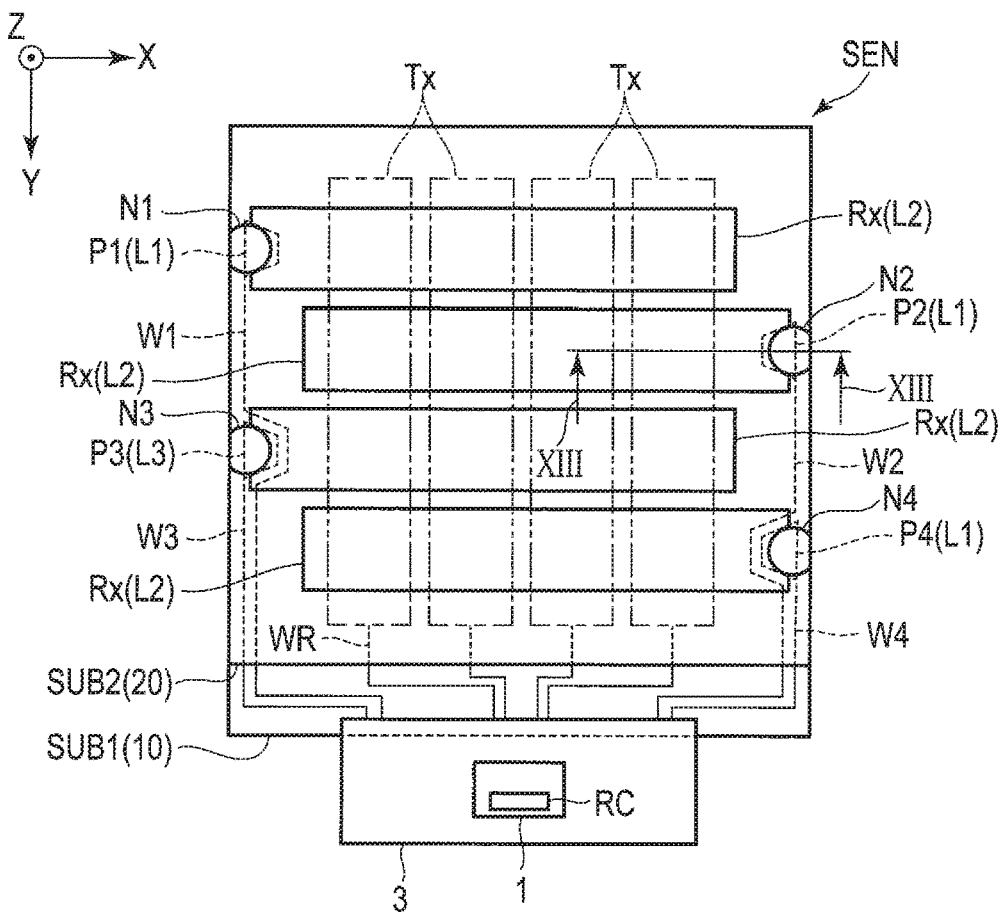
FIG. 13 is a plan view showing a configuration example of a sensor device according to a second embodiment.

Next, the second embodiment will be described. A sensor device will be described in the present embodiment. FIG. 13 is a plan view showing a configuration example of a sensor device SEN according to the second embodiment.

As shown in FIG. 13, the sensor device SEN comprises the first substrate SUB1, the second substrate SUB2, the circuit board 3, the IC chip 1 and the like. The first substrate SUB1 comprises the first basement 10, the first conductive layers L1 including the pads P, and the sensor drive electrodes Tx. The second substrate SUB2 comprises the second basement 20 and the detection electrodes Rx (second conductive layers L2). The concavities N are formed in the second basement 20 and the like.

Figure 14:
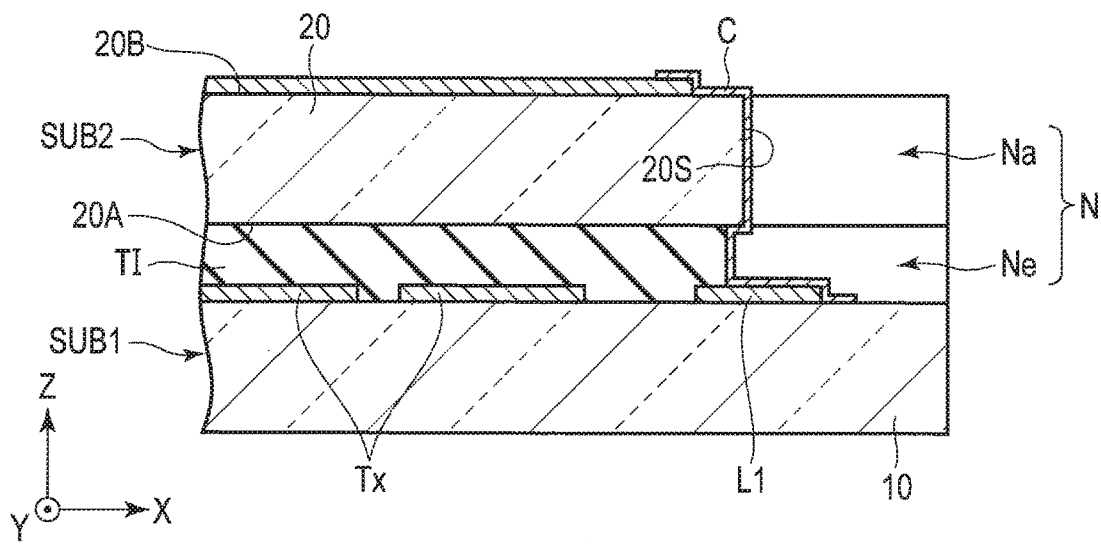
FIG. 14 is a sectional view of the sensor device taken along line XIV-XIV of FIG. 13 and shows an area passing through a concavity.

FIG. 14 is a sectional view of the sensor device SEN taken along line XIV-XIV of FIG. 13 and shows an area passing through the concavity N.

As shown in FIG. 14, the sensor device SEN further comprises a transparent insulating layer TI and the connecting material C. The transparent insulating layer TI is located between the first substrate SUB1 and the second substrate SUB2. For example, the transparent insulating layer TI is formed of a transparent organic insulating material and bonds the first substrate SUB1 and the second substrate SUB2 together.

In this example, the concavity N is formed in a manner substantially similar to that of the above-described first embodiment except that not the organic insulating layer OI but the transparent insulating layer TI is hollowed. The concavity N has the first concave portion Na and a fifth concave portion Ne formed in the transparent insulating layer TI. The fifth concave portion Ne is opposed to the first concave portion Na in the third direction Z and communicates with the first concave portion Na. The wall surface 20S of the second basement 20 is formed in a manner similar to that of the above-described first embodiment.

The connecting material C passes through the first concave portion Na and the fifth concave portion Ne, and electrically connects the first conductive layer L1 and the second conductive layer L2. Although not shown in the drawing, the filling material FI fills a space surrounded by the first concave portion Na and the fifth concave portion Ne and covers the connecting material C.

Also in the sensor device SEN of the second embodiment constituted as described above, the connecting material C is formed through the concavity N. Also in the second embodiment, advantages similar to those of the above-described first embodiment can be obtained.

Third Embodiment

Figure 15:
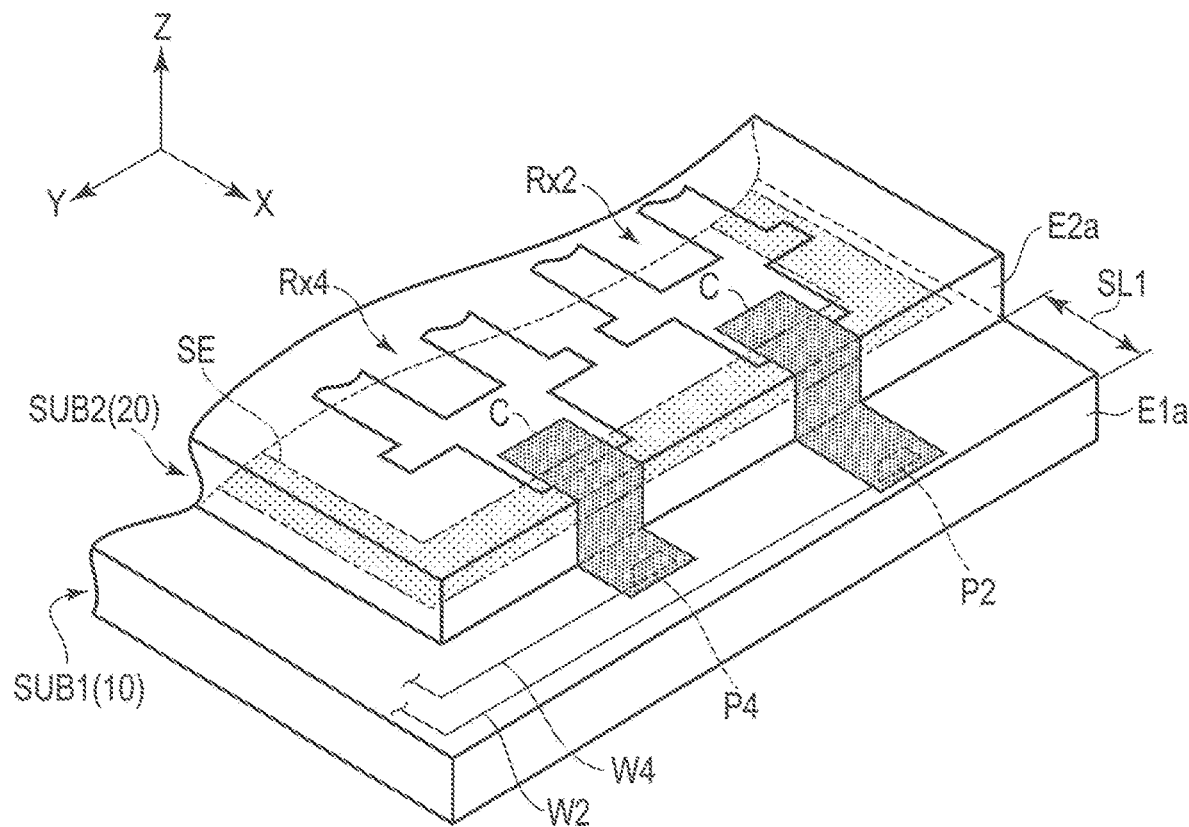
FIG. 15 is a perspective view showing a part of a display device according to a third embodiment.

Next, the third embodiment will be described. A display device will be described in the present embodiment. FIG. 15 is a perspective view showing a part of the display device DSP according to the third embodiment.

As shown in FIG. 15, the above-described concavities N do not exist in the display device DSP. The width of the second basement 20 in the first direction X is less than the width of the first basement 10 in the first direction X. The second end surface E2a is not aligned with the first end surface E1a in the third direction Z. In the present embodiment, the amount of deviation SL1 between the end surfaces is approximately 0.1 mm.

The pads P2 and P4 and the wiring lines W2 and W4 are located on the first end surface E1a side of the sealing member SE. The wiring line W2 extends in an area on the first end surface E1a side of the wiring line W4. The pad P2 is located on the first end surface E1a side of the pad P4. The connecting materials C are opposed to the second end surface E2a and are in contact with the second end surface E2a. The length in the first direction X of a portion of the connecting material C connected to the pad P2 which is located on the first substrate SUB1 is greater than the length in the first direction X of a portion of the connecting material C connected to the pad P4 which is located on the first substrate SUB1.

According to the display device DSP of the third embodiment constituted as described above, the width of the second basement 20 is less than the width of the first basement 10. The connecting materials C are opposed to the second end surface E2a, are in contact with the second end surface E2a, and connect the detection electrodes Rx and the pads P, respectively. Also in the third embodiment, advantages similar to those of the above-described first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modified examples as would fall within the scope and spirit of the inventions. It is possible to combine two or more embodiments if needed.

What is claimed is:
1. A display device comprising:
   a first substrate comprising a first basement and a first conductive layer, the first basement including a first end surface;
   a second substrate comprising a second basement and a second conductive layer and opposed to the first substrate, the second basement including a second end surface; and
   a display function layer located between the first substrate and the second substrate,
   wherein
   the second end surface includes a flat portion located in a same plane as the first end surface, and a first concave portion formed toward an inside of the second basement with respect to each of the flat portion and the first end surface in a plan view,
   the first conductive layer is exposed to an outside of the second basement by the first concave portion, and
   a connecting material which electrically connects the first conductive layer and the second conductive layer is provided in the first concave portion.

2. The display device of claim 1, further comprising:
a sealing member between the first substrate and the second substrate, which is provided on an outside of the display function layer and bonds the first substrate and the second substrate together,
wherein
the sealing member extends so as to detour the first concave portion.

3. The display device of claim 1, further comprising:
a sealing member between the first substrate and the second substrate, which is provided on an outside of the display function layer and bonds the first substrate and the second substrate together,
wherein
the second substrate comprises a first insulating layer located between the second basement and the sealing member,
the first insulating layer includes a second concave portion formed at a position opposed to the first concave portion,
the first substrate comprises a second insulating layer located between the first conductive layer and the sealing member,
the second insulating layer includes a third concave portion formed at a position opposed to the first concave portion, and
the connecting material electrically connects the first conductive layer and the second conductive layer through the first concave portion, the second concave portion and the third concave portion.

4. The display device of claim 3, wherein a filling material which covers the connecting material is provided in the first concave portion, the second concave portion and the third concave portion.

5. The display device of claim 1, further comprising:
a detection circuit,
wherein
the second conductive layer comprises a detection electrode, and
the detection circuit is electrically connected to the detection electrode via the first conductive layer and the connecting material, and reads a sensor signal output from the detection electrode.

6. The display device of claim 1, wherein
the second conductive layer comprises a detection electrode including a body portion which is located in a display area and a terminal portion which is located in a non-display area on an outside of the display area and is connected to the body portion, and
the connecting material is electrically connected to the terminal portion.

7. The display device of claim 6, further comprising:
a circuit board,
wherein
the body portion extends in a first direction,
the non-display area includes:
a first area;
a second area opposed to the first area in the first direction and located such that the display area is sandwiched between the first area and the second area;
a third area; and
a fourth area opposed to the third area in a second direction crossing the first direction and located such that the display area is sandwiched between the third area and the fourth area,
the circuit board is physically fixed to a part of the first substrate which belongs to the third area, and
the first concave portion is formed in one of the first area and the second area or in both of the first area and the second area.

8. The display device of claim 6, wherein the first substrate comprises a sensor drive electrode crossing the body portion.

9. The display device of claim 1, further comprising:
a controller,
wherein
the first substrate further comprises a pixel electrode and a sensor drive electrode which are located between the first basement and the second substrate,
the second conductive layer comprises a detection electrode,
the controller supplies an image signal to the pixel electrode and a common signal to the sensor drive electrode in a display period in which an image is displayed, and
the controller supplies a sensor drive signal to the sensor drive electrode and reads a sensor signal output from the detection electrode in a sensing period in which sensing is performed.

10. An inter-substrate conducting structure comprising:
a first substrate comprising a first basement and a first conductive layer, the first basement including a first end surface;
a second substrate comprising a second basement and a second conductive layer and opposed to the first substrate, the second basement including a second end surface, and
a detection circuit,
wherein
the second end surface includes a flat portion located in a same plane as the first end surface, and a first concave portion formed toward an inside of the second basement with respect to each of the flat portion and the first end surface in a plan view,
the first conductive layer is exposed to an outside of the second basement by the first concave portion,
a connecting material which electrically connects the first conductive layer and the second conductive layer is provided in the first concave portion,
the second conductive layer comprises a detection electrode, and
the detection circuit is electrically connected to the detection electrode via the first conductive layer and the connecting material, and reads a sensor signal output from the detection electrode.

11. The inter-substrate conducting structure of claim 10, further comprising:
an insulating layer located between the first substrate and the second substrate,
wherein
a contour of the insulating layer detours the first concave portion.

12. The inter-substrate conducting structure of claim 10, further comprising:
an insulating layer located between the first substrate and the second substrate,
wherein
the insulating layer includes a fifth concave portion opposed to the first concave portion, and
the connecting material is further provided in the fifth concave portion.

13. The inter-substrate conducting structure of claim 12, wherein a filling material which covers the connecting material is provided in the first concave portion and the fifth concave portion.

* * * * *